US012747775B2

(12) United States Patent
Fukuike

(10) Patent No.: US 12,747,775 B2
(45) Date of Patent: Sep. 29, 2026

(54) CHAIN

(71) Applicant: TSUBAKIMOTO CHAIN CO., Osaka (JP)

(72) Inventor: Yuji Fukuike, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 176 days.

(21) Appl. No.: 18/845,948

(22) PCT Filed: Feb. 2, 2023

(86) PCT No.: PCT/JP2023/003396
§ 371 (c)(1),
(2) Date: Sep. 11, 2024

(87) PCT Pub. No.: WO2023/176183
PCT Pub. Date: Sep. 21, 2023

(65) Prior Publication Data

US 2025/0180096 A1 Jun. 5, 2025

(30) Foreign Application Priority Data

Mar. 17, 2022 (JP) ................................ 2022-042884

(51) Int. Cl.
*F16G 13/18* (2006.01)
*C09D 7/61* (2018.01)
(Continued)

(52) U.S. Cl.
CPC ............... *F16G 13/18* (2013.01); *C09D 7/61* (2018.01); *F16G 13/02* (2013.01); *F16G 13/06* (2013.01)

(58) Field of Classification Search
CPC ........... F16G 13/02; F16G 13/06; F16G 13/18
See application file for complete search history.

(56) References Cited

U.S. PATENT DOCUMENTS 4,365,003 A * 12/1982 Danforth ................ C23C 22/83 428/560
8,415,026 B2 * 4/2013 Fukuike ................. C23C 26/00 428/657
(Continued)

FOREIGN PATENT DOCUMENTS

JP 2001207118 A * 7/2001 ............ C04B 12/04
JP 2010053900 A * 3/2010
(Continued)

OTHER PUBLICATIONS

Office Action dated Oct. 16, 2025, issued in counterpart KR Application No. 10-2024-7032633, with English translation.(11 pages).
(Continued)

*Primary Examiner* — Atul P. Khare
(74) *Attorney, Agent, or Firm* — WHDA, LLP

(57) ABSTRACT

A chain is made of an iron-based material and includes multiple pairs of outer plates and multiple pairs of inner plates. The chain includes a base film that contains zinc and is formed on the surface of the chain, and a coating film that contains lithium silicate and sodium silicate and is formed on the base film. The mass ratio of the mass of the active ingredient of the lithium silicate to the mass of the active ingredient of the sodium silicate is in a range of 0.07 to 2.5.

4 Claims, 1 Drawing Sheet

(51) Int. Cl.
*F16G 13/02* (2006.01)
*F16G 13/06* (2006.01)

(56) References Cited

U.S. PATENT DOCUMENTS

| | | | | |
|---|---|---|---|---|
| 2017/0037934 | A1 | 2/2017 | Arima et al. | |
| 2017/0037935 | A1 * | 2/2017 | Arima | C09D 163/00 |

FOREIGN PATENT DOCUMENTS

| | | | |
|---|---|---|---|
| JP | 2014-152268 | A | 8/2014 |
| JP | 2014206231 | A * | 10/2014 |
| JP | 2015-209913 | A | 11/2015 |
| JP | 2016-3259 | A | 1/2016 |

OTHER PUBLICATIONS

International Search Report dated Apr. 18, 2023, issued in counterpart International Application No. PCT/JP2023/003396. (2 pages).
Notice of Reasons for Refusal dated Jun. 14, 2022, issued in counterpart of Japanese Patent Application No. 2022-042884. (4 pages).

* cited by examiner

CHAIN

CROSS-REFERENCE TO RELATED APPLICATIONS

This application is national stage application of International Application No. PCT/JP2023/003396, filed on Feb. 2, 2023, which claims the benefit of priority from Japanese Patent Application No. 2022-042884, filed on Mar. 17, 2022, the entire contents of each of which are incorporated herein by reference.

TECHNICAL FIELD

The present invention relates to a chain that is made of an iron-based material and includes multiple pairs of outer plates and multiple pairs of inner plates.

BACKGROUND ART

Patent Literature 1 discloses a rust-preventive water-based paint composition for improving the corrosion resistance of metal surfaces of automobile parts, construction materials and the like. This rust-preventive water-based paint composition contains an acrylic resin, an inorganic reactant made by mixing water glass and alkyl silicate, and water as a solvent. The rust-preventive water-based paint composition is applied to the surface of a metal substrate. The rust-preventive water-based paint composition contains silica solid content of water glass in the inorganic reactant. The silica solid content of the water glass constitutes 75% to 90% by weight of the total solid content of the water glass and the alkyl silicate in the inorganic reactant.

CITATION LIST

Patent Literature

Patent Literature 1: Japanese Laid-Open Patent Publication No. 2016-3259

SUMMARY OF INVENTION

Technical Problem

When the conventional rust-preventive water-based paint composition described above is applied to the surface of a chain, the corrosion resistance of the chain is insufficient.

It is an objective of the present invention to provide a chain having better corrosion resistance than conventional chains.

Solution to Problem

To achieve the foregoing objective, in one general aspect, a chain made of an iron-based material includes multiple pairs of outer plates, multiple pairs of inner plates, a base film, and a coating film. The multiple pairs of outer plates and the multiple pairs of inner plates are connected such that the outer plates and the inner plates are arranged alternately. The base film is formed on a surface of the chain and contains zinc. The coating film is formed on the base film, and contains lithium silicate and sodium silicate. A mass ratio of a mass of an active ingredient of the lithium silicate to a mass of an active ingredient of the sodium silicate is in a range of 0.07 to 2.5.

DESCRIPTION OF EMBODIMENTS

Technical Idea of Present Invention

Figure 1:
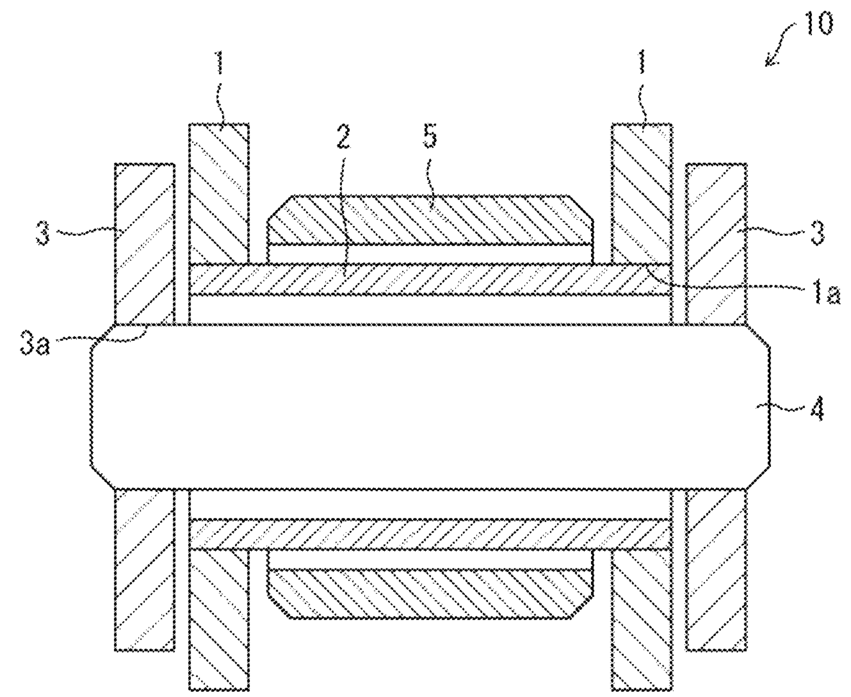
FIG. 1 is a cross-sectional view showing a chain according to an example of the present invention.

As described above, when the conventional rust-preventive water-based paint composition of Patent Literature 1 or the like is applied to the surface of a chain, the corrosion resistance is insufficient. Furthermore, using a conventional rust-preventive water-based paint composition results in an increased film thickness. The performance of a rust-preventive paint is generally proportional to the film thickness. In the field of so-called heavy-duty anticorrosion, the film thickness can be greater than or equal to 100 μm in some cases. Even in the case of general-purpose paints, the film thickness is generally approximately 50 μm. It is common practice to apply multiple layers to increase the film thickness. It is essential for these layers to adhere tightly to each other; however, upper layers do not enhance the rust-preventive performance of lower layers. When multiple layers are applied, both labor costs and material costs increase. Additionally, as the film thickness increases, the fitting of the chain components and the flexibility of the chain deteriorate. The rust-preventive water-based paint composition of Patent Literature 1 also needs to be applied thickly, and this rust-preventive water-based paint composition is not designed to be applied to chains.

When a coating film containing zinc is formed on the surface of parts made of iron-based materials, it is known that the sacrificial protection effect of zinc reduces the formation of red rust (iron oxide) on the surface of the parts. When the present inventor formed a base film containing zinc on the surface of a chain component and further formed a coating film using a paint containing sodium silicate, the corrosion resistance of the chain was significantly improved compared to the case in which only a base film was formed. Chains as discussed in this description are made of an iron-based material and include multiple pairs of outer plates and multiple pairs of inner plates. The multiple pairs of outer plates and the multiple pairs of inner plates are coupled together such that the outer plates and the inner plates are arranged alternately. More specifically, the outer plates in each pair are coupled to each other by two pins. The inner plates in each pair are coupled to each other by two bushings. The outer plates and the inner plates are alternately coupled to each other with the pins being loosely fitted in the bushings. The iron-based material includes steel and the like. The iron-based material may be in the form of an alloy, an intermetallic mixture, or the like.

The present inventor has found that when a paint containing sodium silicate is used, the water resistance of the coating film is poor and slippage occurs on the surfaces of the chain. As a result of diligent research, the present inventor has discovered that, when a coating film containing lithium silicate and sodium silicate in a specified mass ratio is formed on a base film containing zinc, the coating film has a favorable water resistance and a smooth surface, and the chain maintains favorable corrosion resistance over an extended period. This led to the completion of the present invention.

A chain according to one aspect of the present invention includes a base film that contains zinc and is formed on the surface of the chain, and a coating film that contains lithium silicate and sodium silicate and is formed on the base film. The mass ratio of the mass of the active ingredient of the lithium silicate to the mass of the active ingredient of the sodium silicate is in a range of 0.07 to 2.5.

According to the chain of one aspect of the present invention, even when the outermost layer is a coating film that does not contain zinc, the sacrificial protection effect of zinc contained in the base film is maintained, and thus the chain has favorable corrosion resistance over an extended period of time. Since the coating film contains lithium silicate in addition to sodium silicate, the coating film has an improved water resistance while maintaining a favorable rust resistance. The film-forming ability of the coating film is also favorable, and the surface of the coating film is smooth. Since the coating film resists peeling and has a lasting favorable rust resistance, the film thickness may be relatively thin. This reduces both labor and material costs and reduces the deterioration of the fitting and flexibility unique to chains.

Embodiment

Chain

One embodiment of the present invention will now be described.

A chain according to the embodiment of the present invention is made of an iron-based material. Examples of the chain include a bushing chain, a roller chain, and the like. A bushing chain includes multiple pairs of inner plates, multiple bushings, multiple pairs of outer plates, and multiple pins. The multiple pairs of outer plates and the multiple pairs of inner plates are coupled together such that the outer plates and the inner plates are arranged alternately. Specifically, each inner plate has bushing press-fitting holes at the opposite ends in the longitudinal direction. The inner plates in each pair are coupled to each other by press-fitting the bushings into the bushing press-fitting holes with the inner surfaces of the inner plates facing each other. Each outer plate has pin press-fitting holes at the opposite ends in the longitudinal direction. The outer plates in each pair are arranged between two pairs of the inner plates arranged in the longitudinal direction and on the outer sides of the inner plates with the inner surfaces of the outer plates facing each other. At the ends of the outer plates in each pair, two pins are press-fitted into the pin press-fitting holes while being loosely fitted to the inner circumferential surfaces of the two bushings, respectively, so that a pair of the outer plates and two pairs of the inner plates are coupled together. In this manner, multiple pairs of the outer plates and multiple pairs of the inner plates are coupled to each other such that the outer plates and the inner plates are arranged alternately to form the chain. In the case of a roller chain, rollers are further loosely fitted to the outer circumferential surfaces of the bushings.

Specific shapes of the inner plates and the outer plates used in the chain of the present invention include a stadium shape, a figure-eight shape, and the like.

Base Film

A base film containing zinc is formed on the surfaces of the chain according to the embodiment of the present invention. The base film may be formed by using, for example, a zinc-rich paint. The zinc-rich paint is a paint containing a relatively large amount of zinc, for example, a paint containing 70% or more of zinc. When the zinc-rich paint contains zinc powder, the zinc powder is preferably in the form of flakes. The flake form increases the specific surface area, leading to closer contact between the powder particles, and provides not only the active anticorrosion property of the metal itself but also a protective barrier effect (passive anticorrosion property) based on the flake shapes. The base film may be formed by, for example, impact galvanizing. The impact galvanizing refers to, for example, a coating process for forming a uniform zinc alloy film on the surface of a treated object by blasting particles having an iron core in the center and a zinc alloy in the outer shell onto the surface of the treated object with a blasting apparatus.

Coating Film

The chain according to the embodiment of the present invention includes a coating film that contains lithium silicate and sodium silicate and is formed on the base film. The coating film may be formed by using a water-based paint containing lithium silicate and sodium silicate. As the sodium silicate, for example, No. 1 and No. 2 specified in JIS K 1408-1966 can be used. As the lithium silicate, for example, those having a molar ratio of $SiO_2/Li_2O$ of 3.5, 4.5 can be used. The mass ratio of the mass of the active ingredient of the lithium silicate to the mass of the active ingredient of the sodium silicate is in a range of 0.07 to 2.5. In this case, the coating film has a favorable water resistance (moisture resistance), the film-forming ability is favorable, and the chain has favorable corrosion resistance over an extended period of time. The lower limit of the mass ratio becomes more preferable as the value increases in the order of 0.077, 0.14, 0.15, 0.16, 0.23, 0.29, 0.44, 0.58, 0.62, and 0.65. The upper limit of the mass ratio becomes more preferable as it decreases in the order of 2.49, 2, 1.9, and 1.86. The range of the mass ratio is more preferably a range of 0.14 to 2, and still more preferably a range of 0.6 to 2.

The paint containing lithium silicate and sodium silicate (hereinafter, referred to as a topcoat paint) is obtained by mixing and stirring the components according to a typical manufacturing method. During this process, in addition to the aforementioned components, paint additives such as a wetting dispersant, a wetting agent, a defoamer, a thickener, a pH adjuster, a surface conditioner, and a friction coefficient adjuster may be blended.

Examples of the thickener include ethers of hydroxyethyl cellulose, methyl cellulose, methylhydroxypropyl cellulose, ethylhydroxyethyl cellulose, and methylethyl cellulose, and mixtures of these materials.

The topcoat paint may contain water in an appropriate amount depending on the coating method, the thickness of the coating film, the baking conditions, and the like. The topcoat paint preferably contains water in an amount in a range of 20% by mass to 99% by mass.

Coating Process

The topcoat paint can be applied onto the base film by brush coating, spraying, immersion treatment such as immersion coating (dip coating) and immersion rotation (dip spinning), or the like.

After the topcoat paint is applied to the base film, the paint is preferably cured by heating. Volatile components of the paint may be evaporated beforehand through drying prior to curing. The heat curing of the topcoat paint is preferably performed in a range of approximately 100° C. to 200° C. for 10 to 60 minutes. The topcoat paint may be applied to the base film multiple times.

From the perspective of achieving favorable corrosion resistance and cost-effectiveness, it is preferable for the coating quantity of the topcoat paint to be in a range of 0.5 $g/m^2$ to 10 $g/m^2$, more preferably in a range of 1 $g/m^2$ to 10 $g/m^2$, and even more preferably in a range of 3 $g/m^2$ to 7 $g/m^2$. The total thickness of the base film and the coating film is preferably in a range of 1 μm to 30 μm, more preferably in a range of 5 μm to 25 μm. The film thickness can be relatively thin because of the favorable rust resistance. This reduces both labor and material costs and improves the fitting of the chain components and the flexibility of the chain.

Since the coating film formed as described above contains lithium silicate in addition to sodium silicate, the coating film achieves a favorable balance between rust resistance and water resistance. When this coating film is applied to the zinc-containing base film formed on the chain, a sacrificial protection effect, which reduces corrosion of zinc, is observed. Although the exact mechanism is not clear, it is believed that a reaction occurs between the sodium silicate and the zinc, maintaining the rust resistance of the zinc-containing base film over an extended period of time. The coating film also has a favorable film-forming ability, reducing the likelihood of peeling and thus maintaining the corrosion resistance of the chain over an extended period of time. The surface of the coating film is smooth, allowing the chain to move smoothly. It has been observed that the chain according to the embodiment of the present invention maintains a favorable corrosion resistance even when a lubricant is applied.

EXAMPLES

Hereinafter, the present invention will be described in detail with reference to Examples and Comparative Examples, but the present invention is not limited to these Examples.

Topcoat Paints

Formulation Example 1

Lithium silicate, sodium silicate, water, a thickener, a surface modifier, and a friction coefficient modifier were stirred and mixed at room temperature for one hour in accordance with the formulation (shown in parts by mass) in Table 1 below to obtain a composition of Formulation Example 1. The active ingredients of lithium silicate and sodium silicate were 23.4% and 40.3%, respectively. Table 1 also shows the mass of the solid content (active ingredient) of lithium silicate and sodium silicate, and the mass ratio between the mass of the active ingredient of lithium silicate and the mass of the active ingredient of sodium silicate.

TABLE 1

(Parts by Mass)

| Raw Materials | Formulation Example 1 | Formulation Example 2 | Formulation Example 3 | Formulation Example 4 | Formulation Example 5 | Formulation Example 6 | Formulation Example 7 | Formulation Example 8 | Formulation Example 9 | Formulation Example 10 | Formulation Example 11 | Formulation Example 12 | Formulation Example 13 |
|---|---|---|---|---|---|---|---|---|---|---|---|---|---|
| Lithium Silicate | 4.0 | 8.5 | 10.0 | 20.0 | 20.0 | 28.0 | 25.0 | 28.0 | 25.0 | 32.0 | 30.0 | 0 | 30.0 |
| Sodium Silicate | 30.0 | 30.0 | 20.0 | 20.0 | 18.0 | 18.0 | 15.0 | 15.0 | 10.0 | 10.0 | 7.0 | 30 | 5.0 |
| Water | 69 | 69 | 69 | 69 | 69 | 69 | 69 | 69 | 69 | 69 | 69 | 69 | 69 |
| Thickener | 0.6 | 0.6 | 0.6 | 0.6 | 0.6 | 0.6 | 0.6 | 0.6 | 0.6 | 0.6 | 0.6 | 0.6 | 0.6 |
| Surface Conditioner | 0.2 | 0.2 | 0.2 | 0.2 | 0.2 | 0.2 | 0.2 | 0.2 | 0.2 | 0.2 | 0.2 | 0.2 | 0.2 |
| Friction Coefficient Adjuster | 0.3 | 0.3 | 0.3 | 0.3 | 0.3 | 0.3 | 0.3 | 0.3 | 0.3 | 0.3 | 0.3 | 0.3 | 0.3 |
| Total | 104.1 | 108.6 | 100.1 | 110.1 | 108.1 | 116.1 | 110.1 | 113.1 | 105.1 | 112.1 | 107.1 | 100.1 | 105.1 |
| Solid Content | | | | | | | | | | | | | |
| Li-Silicate | 0.9 | 2.0 | 2.3 | 4.7 | 4.7 | 6.6 | 5.9 | 6.6 | 5.9 | 7.5 | 7.0 | 0.0 | 7.0 |
| Na-Silicate | 12.1 | 12.1 | 8.1 | 8.1 | 7.3 | 7.3 | 6.0 | 6.0 | 4.0 | 4.0 | 2.8 | 12.1 | 2.0 |
| Ratio of Solid Content | | | | | | | | | | | | | |
| Li-Silicate/Na-Silicate | 0.077 | 0.16 | 0.29 | 0.58 | 0.65 | 0.90 | 0.97 | 1.08 | 1.45 | 1.86 | 2.49 | 0.00 | 3.48 |

Furthermore, the coating film configured as described above does not contain aluminum, preventing the generation of aluminum wear debris even when the chain is repeatedly bent. Therefore, the coating film effectively prevents the reduction in chain flexibility due to aluminum adhesion or aluminum wear debris. If the coating film contained aluminum, mixing strong alkaline sodium silicate and lithium silicate with aluminum in the paint could result in a reaction between the aluminum and the alkali within the mixture, potentially generating gas. Therefore, in such cases, a silane coupling agent and silane compound are typically added to the paint to suppress gas generation due to the reaction between aluminum and the alkali. In order to suppress the gas by reacting the silane coupling agent and the silane compound with aluminum, various processes would be required, and the manufacturing process would become complicated. In this respect, since the above-described coating film does not contain aluminum, it is not necessary to add a silane coupling agent and a silane compound to the paint. This facilitates management of the manufacturing steps.

Formulation Examples 2 to 13

Topcoat paints of Formulation Examples 2 to 13 were obtained in the same manner as in Formulation Example 1 according to the formulations on Table 1. The topcoat paint of Formulation Example 12 did not contain lithium silicate.

Moisture Resistance Test

Using a doctor blade, the topcoat paints of Formulation Examples 1 to 12 were applied to glass plates measuring 150 mm in length and 100 mm in width at a coating quantity of 20 g/m$^2$. The coating films were baked at 120° C. for 15 minutes, followed by an additional baking at 180° C. for 25 minutes. The glass plates with the formed coating films were then placed in a test tank at a temperature of 50° C. and a relative humidity of 90% or higher for 15 hours. The residual amount (%) of the coating film was calculated from the difference in mass of the glass plates before and after the humidity resistance test. The results of the evaluation are shown in Table 2 below.

The criteria for evaluating the moisture resistance are as follows.

○: 75% or more

Δ: 15% or more x: 10% or less

TABLE 2

| | Formulation Example 1 | Formulation Example 2 | Formulation Example 3 | Formulation Example 4 | Formulation Example 5 | Formulation Example 6 | Formulation Example 7 | Formulation Example 8 | Formulation Example 9 | Formulation Example 10 | Formulation Example 11 | Formulation Example 12 | Formulation Example 13 |
|---|---|---|---|---|---|---|---|---|---|---|---|---|---|
| Moisture Resistance | 15.5% | 75.8% | 79.0% | 86.0% | 90.0% | 93.0% | 93.9% | 94.1% | 94.3% | 94.5% | 94.5% | ~10% | — |
| | Δ | ○ | ○ | ○ | ○ | ○ | ○ | ○ | ○ | ○ | | x | — |
| Film Formation | ○ | ○ | ○ | ○ | ○ | ○ | ○ | ○ | ○ | ○ | Δ | ○ | x |

Film-Forming Ability Test

A base film with a thickness in a range of 0.5 μm to 20 μm was formed on a steel plate by impact galvanizing. The topcoat paints of Formulation Examples 1 to 13 were then applied to the base film on the steel plate by dip-spin coating. After baking at a temperature in a range of 100° C. to 200° C. for 40 minutes, the surface was evaluated by touching with a finger. The results of the evaluation are shown in Table 2 above.

The criteria for evaluation are as follows.

○: The surface felt smooth to the touch.

Δ: The surface felt somewhat rough to the touch, but was generally smooth.

x: The surface felt rough to the touch and the coating film peeled off.

Table 2 shows that the topcoat paints of Formulation Examples 1 to 11, which contained lithium silicate, exhibited favorable moisture resistance. Specifically, when the mass ratio (mass of the active ingredient of lithium silicate/mass of the active ingredient of sodium silicate) was in a range of 0.07 to 2.5, the moisture resistance was favorable. The moisture resistance evaluation in Table 2 shows that as the lower limit of the mass ratio increased in the order of 0.077, 0.14, 0.15, and 0.16, the moisture resistance became progressively preferable. When the mass ratio exceeded 0.16, the moisture resistance exceeded 75%. As the lower limit of the mass ratio further increased in the order of 0.23, 0.29, 0.44, 0.58, 0.62, and 0.65, the moisture resistance became even more preferable. When the mass ratio exceeded 0.65, the moisture resistance reached 90%. From the perspective of film-forming ability, the upper limit of the mass ratio became more preferable as it decreased in the order of 2.49, 2, 1.9, and 1.86.

Production of Chain

Example 1

Figure 2:
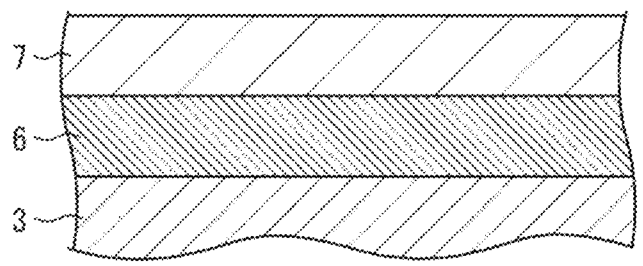
FIG. 2 is an enlarged cross-sectional view of a surface of an outer plate of the chain shown in FIG. 1, taken along a plane orthogonal to the surface.

FIG. 1 is a cross-sectional view showing the chain 10 according to Example 1 of the present invention. FIG. 2 is an enlarged cross-sectional view of a surface of an outer plate 3 of the chain 10 shown in FIG. 1, taken along a plane orthogonal to the surface. The chain 10 includes multiple pairs of inner plates 1, multiple pairs of outer plates 3, multiple bushings 2, multiple pins 4, and multiple rollers 5. The multiple pairs of outer plates 3 and the multiple pairs of inner plates 1 are coupled together such that the outer plates 3 and the inner plates 1 are arranged alternately. Specifically, each inner plate 1 has bushing press-fitting holes 1*a* at the opposite ends in the longitudinal direction. The inner plates 1 in each pair are coupled to each other by press-fitting the bushings 2 into the bushing press-fitting holes 1*a* with the inner surfaces of the inner plates 1 facing each other. FIG. 1 is a cross-sectional view taken along a plane orthogonal to the plane of the inner plates 1 at one end of the inner plates 1. A roller 5 is loosely fitted on the outer circumferential surface of the bushing 2. Each outer plate 3 has pin press-fitting holes 3*a* at the opposite ends in the longitudinal direction. The outer plates 3 in each pair are arranged between two pairs of inner plates 1 arranged in the longitudinal direction and on the outer sides of the inner plates 1 with the inner surfaces of the outer plates 3 facing each other. At the ends of the outer plates 3 in each pair, two pins 4 are press-fitted into the pin press-fitting holes 3*a* while being loosely fitted to the inner circumferential surfaces of the two bushings 2. Thus, the outer plates 3 in each pair and two pairs of the inner plates 1 are coupled together. In this manner, multiple pairs of the outer plates 3 and multiple pairs of the inner plates 1 are coupled to each other such that the outer plates 3 and the inner plates 1 are arranged alternately to form the chain 10.

Each of the inner plates 1, the bushings 2, the outer plates 3, the pins 4, and the rollers 5 has, on the surface, a base film 6 and a coating film 7 formed on the base film 6 using the topcoat paint. FIG. 2 shows a state in which the base film 6 and the coating film 7 are formed on the surface of the outer plate 3.

The base film 6 was formed on the surface of each component of the chain 10 by impact galvanizing. The coating film 7 was formed on the base film 6 by applying the topcoat paint of Formulation Example 1 by a dip-spin process and baking it at a temperature in a range of 100° C. to 200° C. for 40 minutes. In this manner, the chain 10 according to Example 1 was produced. The composition of the base film 6 and coating film 7 is shown in Table 1 below.

TABLE 3

| | Example 1 | Example 2 | Example 3 | Example 4 | Example 5 | Example 6 | Example 7 | Example 8 | Example 9 | Example 10 | Example 11 | Comparative Example 1 |
|---|---|---|---|---|---|---|---|---|---|---|---|---|
| First Layer (Base Film) | Impact Galvanizing | | | | | | | | | | | Impact Galvanizing |
| Second Layer(Coating Film) | Formulation Example 1 | Formulation Example 2 | Formulation Example 3 | Formulation Example 4 | Formulation Example 5 | Formulation Example 6 | Formulation Example 7 | Formulation Example 8 | Formulation Example 9 | Formulation Example 10 | Formulation Example 11 | None |
| Time Until Formation of Rust | 1800 | 1600 | 1287 | 1145 | 1195 | 1287 | 1680 | 1193 | 1205 | 1193 | 1100 | 500 |

Examples 2 to 11

Chains 10 of Examples 2 to 11 were produced in the same manner as in Example 1, except that the topcoat paints of Formulation Examples 2 to 11 were used to form the coating films 7.

Comparative Example 1

The chain of Comparative Example 1 was produced in the same manner as in Example 1, except that the coating film 7 was not formed on the base film 6.

Salt Spray Test (Corrosion Resistance Evaluation Test)

The chains 10 of Examples 1 to 11 and the chain of Comparative Example 1 were placed in a salt spray test (SST) apparatus, which was configured to generate salt mist. In accordance with JIS-Z2371, the salt spray conditions were set as follows: test chamber temperature of 35±1° C., test chamber relative humidity in a range 95% to 98%, humidifier temperature of 47±1° C., and salt solution concentration of 5 w/v %. The time until red rust was visually observed at the fitting portion of the pin 4 to the outer plate 3 and on the surface of the outer plate 3 was measured. The results are shown in Table 3 above.

Table 3 shows that the chains 10 of Examples 1 to 11, which had the base film 6 and the coating film 7, exhibited significantly improved corrosion resistance compared to the chain of Comparative Example 1, which did not have the coating film 7.

The results of the moisture resistance test, the film-forming ability test, and the corrosion resistance evaluation test show that when the mass ratio was in a range of 0.07 to 2.5, the corrosion resistance was favorable, and both moisture resistance and film-forming ability were also favorable. When the mass ratio was in a range of 0.14 to 2, the moisture resistance and film-forming ability were further improved. When the mass ratio was in a range of 0.6 to 2, the moisture resistance was even more improved.

As described above, the chain according to the embodiment of the present invention, which contains lithium silicate and sodium silicate in a mass ratio in a range of 0.07 to 2.5 on a base film containing zinc, shows a favorable balance between the water resistance and the film-forming ability of the coating film and the corrosion resistance of the chain, leading to higher corrosion resistance than conventional chains. The base film is not limited to being formed by impact galvanizing; it is predicted that similar effects can be achieved when the base film containing zinc is formed using zinc-rich paint, for example.

The present invention is not limited to the embodiment described above, and various modifications can be made within the scope of the claims. Embodiments obtained by appropriately combining the technical means disclosed in different embodiments are also included in the technical scope of the present invention.

REFERENCE SIGNS LIST

1) Inner Plate
2) Bushing
3) Outer Plate
4) Pin
5) Roller
6) Base Film
7) Coating Film
10) Chain

The invention claimed is:

1. A chain made of an iron-based material, comprising:

multiple pairs of outer plates and multiple pairs of inner plates, the multiple pairs of outer plates and the multiple pairs of inner plates being connected such that the outer plates and the inner plates are arranged alternately;

a base film formed on a surface of the chain, the base film containing zinc; and a coating film formed on the base film, the coating film containing lithium silicate and sodium silicate, wherein a mass ratio of a mass of an active ingredient of the lithium silicate to a mass of an active ingredient of the sodium silicate is in a range of 0.07 to 2.5, and wherein the coating film does not contain aluminum.

2. The chain according to claim 1, wherein the base film is formed by impact galvanizing.

3. The chain according to claim 1, wherein the mass ratio is in a range of 0.14 to 2.

4. The chain according to claim 1, wherein a total thickness of the base film and the coating film is in a range of 1 μm to 30 μm.

* * * * *